(12) United States Patent   (10) Patent No.: US 6,659,219 B2
Okada et al.                  (45) Date of Patent:     Dec. 9, 2003

(54) ELECTRIC POWER STEERING DEVICE

(75) Inventors: Jun Okada, Maebashi (JP); Toshihiro Fukuda, Maebashi (JP); Hiroshi Eda, Maebashi (JP)

(73) Assignee: NSK Ltd., Tokyo (JP)

( * ) Notice: Subject to any disclaimer, the term of this patent is extended or adjusted under 35 U.S.C. 154(b) by 97 days.

(21) Appl. No.: 10/038,802

(22) Filed: Dec. 31, 2001

(65) Prior Publication Data

US 2003/0121714 A1 Jul. 3, 2003

(51) Int. Cl.[7] .................................................. B62D 5/04
(52) U.S. Cl. ....................................................... 180/444
(58) Field of Search ................................ 180/443, 444; 384/42

(56) References Cited

U.S. PATENT DOCUMENTS 4,577,715 A * 3/1986 Saito ........................... 180/444
6,178,839 B1 * 1/2001 Yoshida et al. ............... 74/459
6,454,042 B1 * 9/2002 Yoshida et al. ............. 180/444

FOREIGN PATENT DOCUMENTS

| JP | 07-165089 A | 6/1995 |
|----|----|----|
| JP | 08-301130 A | 11/1996 |
| JP | 10-095354 A | 4/1998 |
| JP | 170866 | * 6/2000 |
| JP | 2000-168581 A | 6/2000 |
| JP | 318629 | * 11/2000 |
| JP | 145080 | * 5/2002 |
| JP | 002220 | * 1/2003 |

* cited by examiner

*Primary Examiner*—Lesley D. Morris
*Assistant Examiner*—Matthew Luby
(74) *Attorney, Agent, or Firm*—Sidley Austin Brown & Wood LLP

(57) ABSTRACT

An easy-to-assemble electric power steering device, in which an approximately cylindrical housing is divided at about the central part into a first chamber and a second chamber. The first chamber is for housing a motor for assisting the steering force. A stator of the motor is inserted at one end of the housing and fixed. The second chamber is for housing a rack shaft assembly which comprises a rack shaft connected with the steering shaft and a ball screw mechanism. The rack shaft assembly is inserted at the other end of the housing, to thereby spline a rotor of the motor for assisting the steering force with a nut of the ball screw mechanism. A bearing supporting the nut of the ball screw mechanism is axially movably held in the inner wall of the second chamber. The rack shaft is arranged through the first and second chambers of the housing.

6 Claims, 3 Drawing Sheets

ELECTRIC POWER STEERING DEVICE

BACKGROUND OF THE INVENTION

1. Field of the Invention

This invention relates to an electric power steering device for motor vehicles.

2. Prior Art

The electric power steering device for motor vehicles is equipped with a mechanism which transmits the rotation of a steering shaft rotated by the operation of a steering wheel, to a rack shaft through a pinion, thereby steering vehicle driving wheels through a tie rod connected to either end of the rack shaft. Furthermore an auxiliary motor for steering device is equipped. With the detection of a steering torque produced at the steering shaft, the motor is excited in accordance with a signal of the detection. The driving torque of the motor is transmitted to a steering rack shaft, to thereby assist the steering force of the steering wheel.

For the electric power steering device of the above constitution, there have been proposed various kinds of configurations as seen in Japanese Laid Open Patent Publication No. H7-165089, Japanese Laid Open Patent Publication No. H8-301130, Japanese Laid Open Patent Publication No. H10-95354, and Japanese Laid Open Patent Publication No. 2000-168581. One example of configurations of such prior art electric power steering devices will be explained by referring to FIG. 3.

FIG. 3 is a sectional view that shows a major portion of the configuration of the steering rack shaft and motor section of the electric power steering device. In FIG. 3, numeral 101 denotes a steering rack shaft; and 102 represents a steering shaft. The steering shaft 102 is fitted with an unillustrated pinion, which meshes with the teeth of the rack on the rack shaft 101.

In FIG. 3, a screw 107b of a later-described ball nut mechanism is formed on the left side of the rack shaft 101. Further the left end of the rack shaft 101 is connected with a tie rod not shown.

Numerals 103 and 104 denote housings. A first housing 103 and a second housing 104 are so constituted as to be separably connected at the part A. In the first housing 103 is mounted a later-described motor for assisting the steering force. In the second housing 104 a later-described ball nut mechanism 107 is arranged. The rack shaft 101 is penetrated through the inside of the first housing 103 and the second housing 104, and axially slidably supported.

Numeral 105 represents a motor mounted coaxially with the rack shaft 101 to assist the steering force. A stator 105a is fixedly mounted in the first housing 103, while a rotor 105b is coaxially mounted outside of the rack shaft 101 and is rotatably supported by bearings 106a and 106b inside of the first housing 103.

Numeral 107 denotes a ball nut mechanism, which includes a hollow cylindrical nut 107a provided with an internal groove of an approximately semicircular form in cross section on the inner surface, a screw 107b with an external groove of an approximately semicircular form in cross section on the outer surface of the rack shaft 101, and a number of balls 107c recirculating, while rolling, in the spiral groove formed by the inner and external grooves.

The nut 107a of the ball nut mechanism 107 is rotatably supported by on a bearing 108 mounted inside of the second housing 104.

In FIG. 3, inside the right end portion of the nut 107a are formed internal spline grooves 107s, which mesh with spline teeth 105s formed on the left end portion of the rotor 105b of the motor 105 as shown in FIG. 3. The nut 107a and the rotor 105b are connected as one body in the direction of rotation and slidably splined in the axial direction.

The rack shaft 101 is axially slidably supported at only two positions: at an unillustrated guide which is located in a section where a pinion provided on a steering shaft 102 meshes with the rack teeth formed on the rack shaft 101, and at the ball nut mechanism 107.

When, in the above-described constitution, the electric current determined in accordance with the steering torque is supplied to the motor 105, the rotor 105b turns to thereby turn the nut 107a of the ball nut mechanism 107 which is splined with the rotor 105b. The rotation of the nut 107a axially moves the rack shaft 101, thus operates the steering mechanism through the tie rod.

The above-described prior-art electric power steering device is assembled by the following procedure. That is, first the stator 105a of the motor 105 is secured in the first housing 103, and then the bearings 106a and 106b are set in the first housing 103, to thereby rotatably support the rotor 105b of the motor 105.

Furthermore, the bearing 108 is set in the second housing 104, to thereby rotatably support the nut 107a of the ball nut mechanism 107.

Next, the first housing 103 and the second housing 104 are jointed at the portion A. At this time, the nut 107a and the rotor 105b are adjusted in position so as to be in the same phase in the direction of rotation so that the inner spline grooves 107s formed in the right end portion of the nut 107a shown in FIG. 3 and the spline teeth 105s formed on the left end portion of the rotor 105b shown in FIG. 3 will mutually mesh, and that the nut 107a and the rotor 105b will be splined simultaneously with the connection of the housing section.

According to the prior-art constitution, the two component members, that is, the outer housing section and the members arranged in the housing, are simultaneously connected. Besides, at the time of this connection, these two members arranged in the housing need phase adjustment in the direction of rotation and then are connected. This procedure is complicated and hard to perform, and therefore will be of low working efficiency. This invention, therefore, is intended to cope with the above-described disadvantage.

SUMMARY OF THE INVENTION

1. A primary object of this invention is to provide a new electric power steering device capable of easily mounting and assembling, a power transmission device including a plurality of members which transmit the rotation of the motor for assisting the steering force, to the steering shaft through a ball nut mechanism.

2. Another object of this invention is to provide a new and easy-to-assemble electric power steering device of the following construction. The housing is separated into a first chamber and a second chamber. In the first chamber, the motor for assisting the steering force is inserted from one end of the housing. In the second chamber, a rack shaft assembly including a rack shaft to be connected to the steering shaft and a ball screw mechanism is inserted from the other end of the housing. The rotor of the motor for assisting the steering force and the rack shaft are connected through the ball screw mechanism so that the rack shaft will pass through the first and second chambers.

3. Further another object of this invention will be clearer from the detailed description of the preferred embodiments with reference to the accompanying drawings.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and together with the description, serve to explain the principles of the invention.

DETAILED DESCRIPTION OF THE PREFERRED EMBODIMENTS

Figure 1:
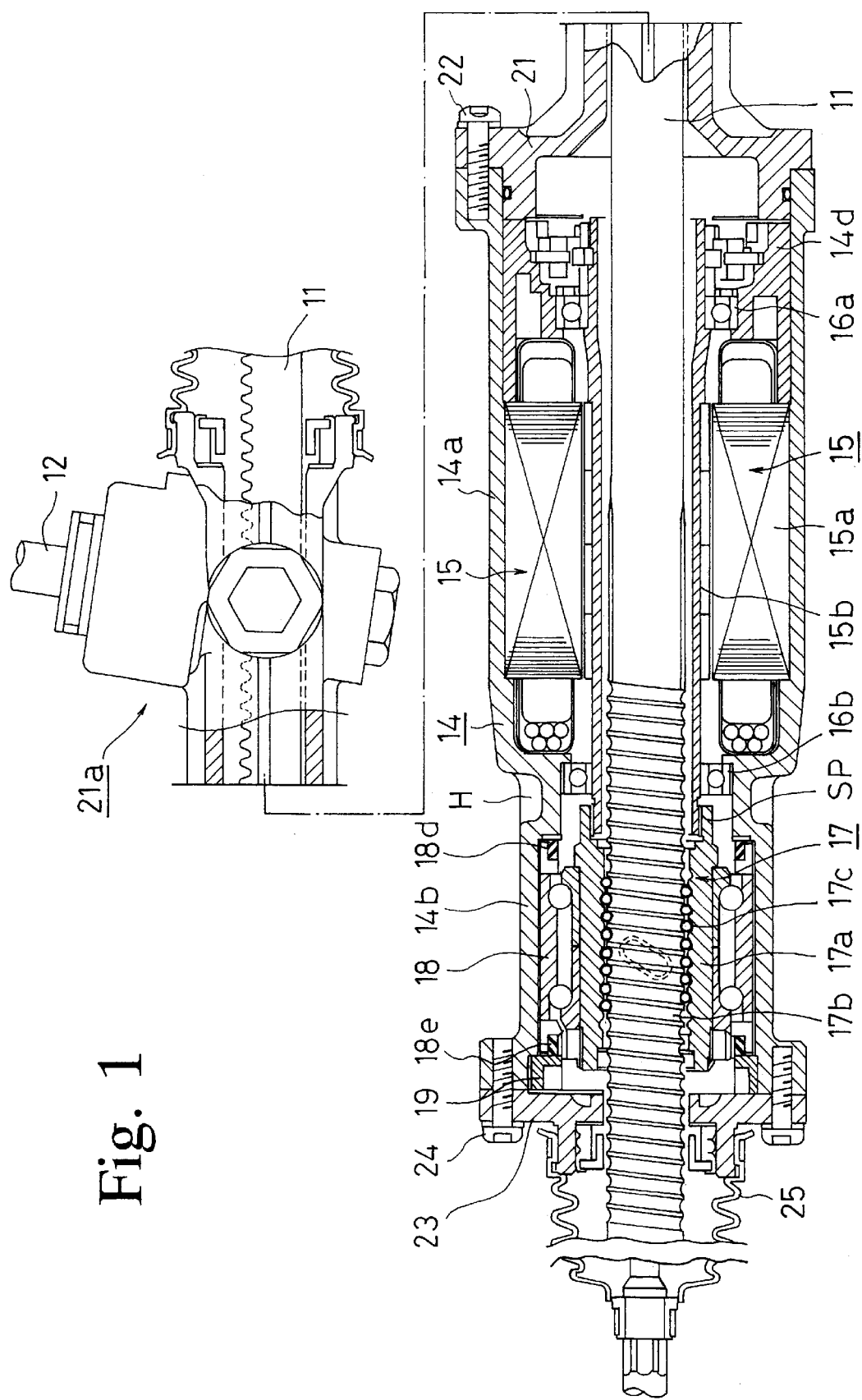
FIG. 1 is a sectional view showing a major portion of the constitution of a rack shaft and motor section of an electric power steering device according to the preferred embodiments of this invention.
Figure 2:
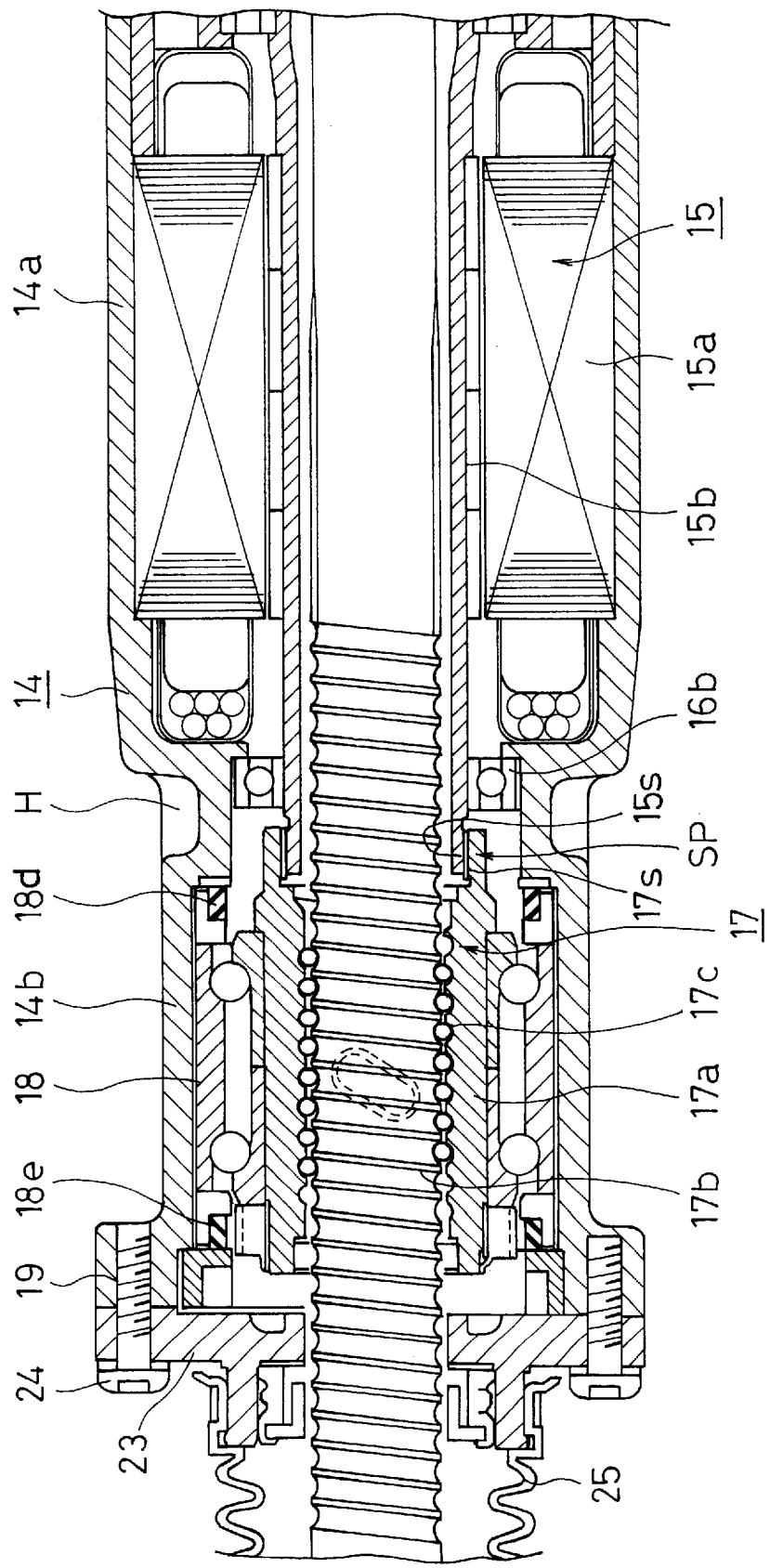
FIG. 2 is a sectional view, partly on large scale, of the electric power steering device shown in FIG. 1.
Figure 3:
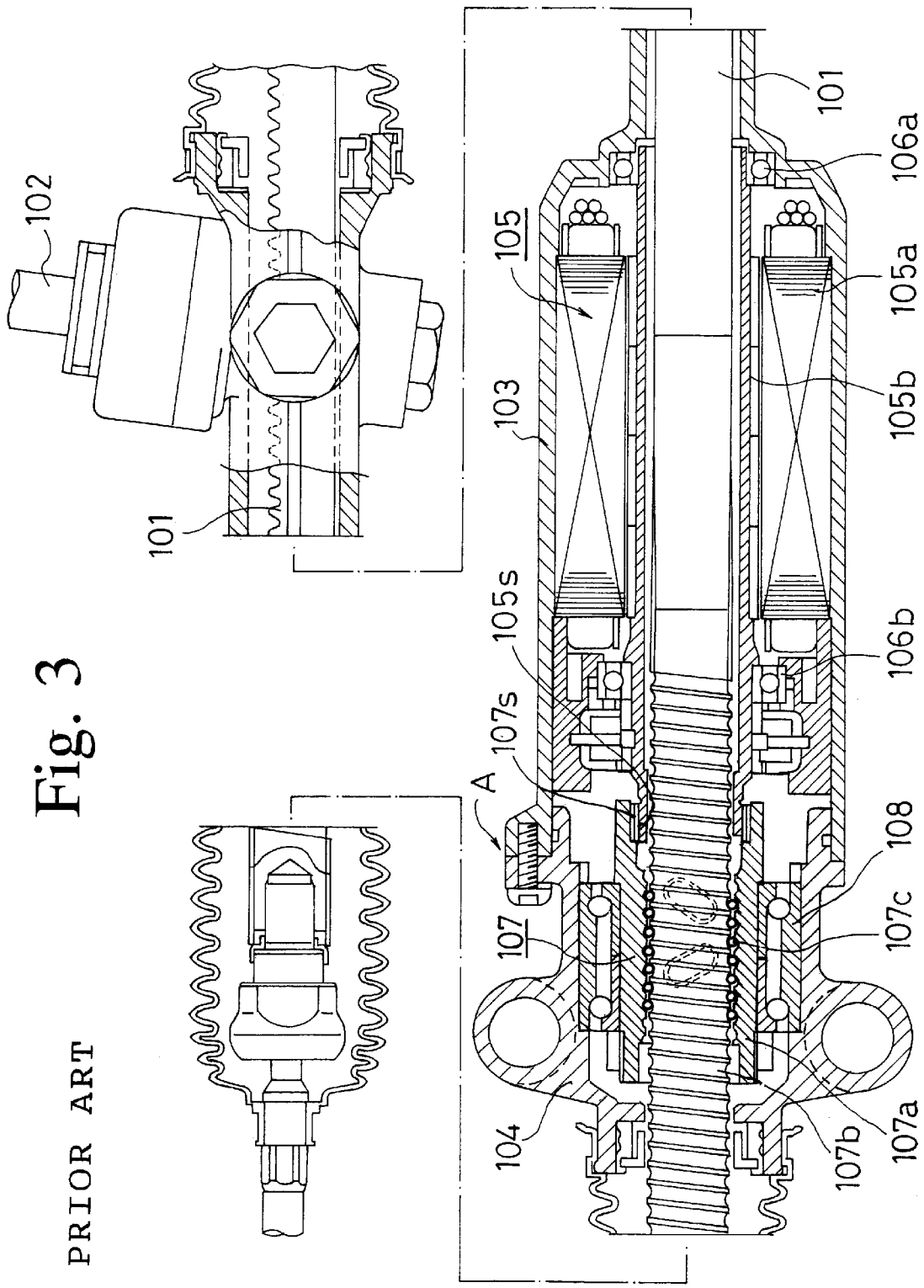
FIG. 3 is a sectional view showing a major portion of the constitution of the rack shaft and motor section of a prior art electric power steering device.

Now, description will be given of preferred embodiments of an electric power steering device according to this invention with reference to the accompanying drawings. FIG. 1 is a sectional view showing a major portion of the constitution of a rack shaft and motor section of an electric power steering device. FIG. 2 is a sectional view, partly on large scale, of the same.

In FIGS. 1 and 2, 11 denotes a rack shaft, and 12 denotes a steering shaft. On the steering shaft 12 an unillustrated pinion is attached, meshing with the rack teeth of the rack shaft 11. On the left side of the rack shaft 11 in FIG. 1, there is formed a screw 17b of a later-described ball nut mechanism, and further on the left end portion thereof is connected an unillustrated tie rod.

Numeral 14 is a housing body, which is a single cylindrical body with a small-diameter portion H formed in about the central part and with a large-diameter portion formed toward both ends. In FIG. 1, a motor housing section 14a for housing a motor for assisting a later-described steering force is located on the right side of the small-diameter portion H, and a nut housing section 14b for housing a nut of a later-described ball nut mechanism 17 is located on the left side of the small-diameter portion H. The rack shaft 11 is inserted through the inside of the housing body 14 and is axially slidably supported.

Numeral 15 denotes the motor for assisting the steering force located coaxially with the rack shaft 11. The stator 15a of the motor 15 is fixed at the motor housing section 14a of the housing body 14, while the rotor 15b is coaxially located on the outer side of the rack shaft 11. The rotor 15b are rotatably supported by the bearings 16a and 16b in the housing body 14.

Numeral 17 represents the ball nut mechanism, which comprises a hollow cylindrical nut 17a provided with an internal groove of an approximately semicircular form in cross section on the inner surface, a screw 17b with an external groove of an approximately semicircular form in cross section on the outer surface of the rack shaft 11, and a number of balls 17c recirculating, while rolling, in the spiral groove formed by the inner and external grooves.

The nut 17a of the ball nut mechanism 17 is rotatably supported by a bearing 18 inside of the nut housing section 14b of the housing body 14. This bearing 18 consists of two inner races. The bearing 18 is axially supported through elastic members 18d and 18e. The nut housing section 14b is formed a little larger in inside diameter than the outside diameter of the bearing 18. Therefore the nut 17a is allowed to be axially slightly displaced.

As is clear from FIG. 2, on the inner surface of the right end portion of the nut 17a is formed an internal spline groove 17s, which meshes with the spline tooth 15s formed on the left end portion of the rotor 15b of the motor 15. The nut 17a and the rotor 15b are connected as one body in the direction of rotation and are axially slidably coupled, forming a splined section SP.

The rack shaft 11 is axially slidably supported just at two points: one at an unillustrated guide located in a part where the pinion provided on the steering shaft 12 meshes with the rack teeth formed on the rack shaft 11, and the other at the ball nut mechanism 17.

In the above-described constitution, when the current determined according to the steering torque is supplied to the motor 15, the rotor 15b rotates, turning the nut 17a of the ball nut mechanism 17 which is engaged with the rotor 15b. The rotation of the nut 17a moves the rack shaft 11 in the axial direction, thereby operating the steering mechanism through the tie rods to steering the wheels.

Next, the procedure for assembling the electric power steering device will be explained as follows. First, the stator 15a of the motor 15 is inserted at the opening located on the right side in FIG. 1, into the motor housing section 14a of the housing body 14. Furthermore, an approximately annular retaining member 14d is inserted to hold the motor 15 from axial movement.

Then the bearing 16b is inserted at the opening located on the left side of the housing body 14 in FIG. 1 and fixed in a predetermined position. Furthermore, the bearing 16a is inserted at the opening located on the right side of the housing body 14 in FIG. 1 and then is fixed in a predetermined position inside the aforesaid retaining member 14d.

The rotor 15b of the motor 15 is inserted at the opening located on the left side in FIG. 1, then is rotatably supported by the bearings 16a and 16b.

In the opening on the right side of the motor housing section 14a of the housing body 14 in FIG. 1, the rack shaft case 21 is provided with a mechanism section 21a where an unillustrated pinion on the steering shaft 12 meshes with the rack shaft 11, and is fixed by a bolt 22.

Next, the rack shaft 11 is provided with a screw 17b section having the external groove of an approximately semicircular form in cross section on the outside surface. In this screw 17b section is fitted the hollow cylindrical nut 17a having the internal groove of an approximately semicircular form in cross section. The ball nut mechanism 17 is assembled through a number of balls 17c in the spiral groove formed by the internal and external grooves. On the outside of the nut 17a, the inner races of the bearing 18 is fixed by a known appropriate means. That is, the rack shaft 11 with the bearing 18 secured on the outside surface of the ball nut mechanism 17 is completed. Hereinafter the assembly thus completed will be called the rack shaft assembly.

In the nut housing section 14b of the housing body 14, there is provided the elastic member 18d which receives the end face on the outer race side of the bearing 18, near the small-diameter portion H. Subsequently, the aforesaid rack shaft assembly is inserted through the opening located on the left side of the housing body 14 in FIG. 1. The spline tooth 15s formed on the left end portion of the rotor 15b in FIG. 1 is engaged with the inner spline groove 17s formed on the inner surface of the right end portion of the nut 17a in FIG. 1 and FIG. 2. Thus the nut 17a and the rotor 15b are splined and one of the end faces (the right side in FIG. 1) of the outer race of the bearing 18 of the rack shaft assembly is held in contact with the elastic member 18d through a washer.

Thereafter, the elastic member 18e is inserted at the left opening of the housing body 14 in FIG. 1 until it contacts the other end face of the outer race (the left side in FIG. 1) of the bearing 18 through a washer. A lock nut 19 is tightened to the housing body 14 to hold the elastic member 18e by the end face of the lock nut 19, to thereby secure the outer race of the bearing 18 to the housing body 14.

Furthermore, secured by a bolt 24 at the left opening section of the housing body 14 in FIG. 1 is a cover body 23 having a hole through which the rack shaft 11 on the tie rod side not shown is inserted. The cover body 23 is provided with a cover 25 covering the rack shaft 11.

According to the electric power steering device of the present embodiment, as explained above, the motor 15 for assisting the steering force is mounted in the housing body 14 by inserting through one end portion (the right end portion in FIG. 1) of the housing body 14, thereby enabling easily mounting the stator 15a and also easily supporting the rotor 15b by the bearings 16a and 16b.

The rack shaft assembly (the rack shaft 11 with the bearing 18 secured on the outer surface of the ball nut mechanism 17) is mounted to the housing body 14 by the following procedure. The rack shaft assembly is inserted at the other end (the left end in FIG. 1) of the housing body 14. At this time, the nut 17a of the ball nut mechanism 17 is rotatably supported by the bearing 18 in the direction of rotation. Therefore, the rack shaft assembly is mounted by inserting into the housing body 14 while lightly turning the nut 17a. That is, the inner spline groove 17s of the nut 17a can easily be engaged with the spline tooth 15s of the rotor 15b, to thereby enabling the mounting of the rack shaft assembly into the housing body 14.

The electric power steering device of this invention, as explained above, can be machined and assembled very easily by the following procedure as compared with the prior art constitution.

That is, the electric power steering device of this invention is provided with an approximately cylindrical housing body which is divided at about the central part into the first chamber and the second chamber and open at both ends. In the first chamber of the housing body, the motor for assisting the steering force is inserted and installed at one open end. In the second chamber, the ball screw mechanism is inserted and installed through the other open end. Since the motor and the ball screw mechanism can easily be installed not only to the housing body but to a single cylindrical housing body, the motor and the ball screw mechanism can easily be aligned with respect to the axis in the radial direction.

The rotor of the motor and the nut of the ball screw mechanism can easily be connected through splines unlike the prior art constitution that needs simultaneously both the connection of the housing body and the splining of the rotor and the nut.

Besides, in the electric power steering device of this invention, the nut of the ball screw mechanism, being axially movably supported by the elastic member when installed to the housing body, will move in the direction of axis even if an axial impact load is applied to the rack shaft, reducing the impact force to thereby prevent damage and other troubles and also the elastic member corrects the alignment error between the rack shaft and ball screw mechanism.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. An electric power steering device, comprising:
   a rack shaft connected with a steering shaft;
   a motor for assisting a steering force with a rotor coaxially disposed on said rack shaft;
   a ball screw mechanism, in which balls are interposed between a nut splined with said rotor and a screw formed on said rack shaft; and
   a single integrally formed housing formed approximately cylindrical on the whole and divided at about the central part into a first chamber and a second chamber and open at opposing ends thereof;
   wherein, said first chamber of said housing and said motor for assisting the steering force are cooperatively adapted for said motor to be inserted at one of said open ends and installed; said second chamber of said housing and said ball screw mechanism are cooperatively adapted for said ball screw mechanism to be inserted at the other open end, and installed; and said rack shaft is inserted through said first and second chambers of said housing and disposed.

2. An electric power steering device as claimed in claim 1, wherein said rotor of said motor for assisting the steering force is disposed coaxially with said rack shaft on the outside of said rack shaft, being rotatably supported with respect to said rack shaft.

3. An electric power steering device as claimed in claim 1, wherein said nut of said ball screw mechanism is rotatably supported by a bearing in said second chamber of said housing, and is axially movable through an elastic member.

4. An electric power steering device as claimed in claim 1, wherein said rotor of said motor for assisting the steering force and said nut of said ball screw mechanism rotate as one body in the direction of rotation, and are splined slidable in the direction of axis.

5. An electric power steering device as claimed in claim 1, wherein said housing is formed smaller in diameter at about the central part than the diameter of both end portions, being divided into said first chamber and said second chamber.

6. A method of providing a power steering device comprising the steps of:

providing a rack shaft;

providing a single integrally formed housing, said housing being approximately cylindrical on the whole and divided at about a central part thereof into a first chamber and a second chamber, each chamber being open at an end thereof;

inserting into said first chamber a motor for assisting a steering force, said motor including a rotor coaxially disposed on said rack shaft;

inserting and installing into said second chamber a ball screw mechanism;

attaching said rotor to said ball screw mechanism; and inserting said rack shaft through said first and second chambers of said housing.

* * * * *